(12) United States Patent
Wang et al.

(10) Patent No.: US 7,002,794 B2
(45) Date of Patent: Feb. 21, 2006

(54) PORTABLE COMPUTER AND BASE MEMBER RECEIVING ARRANGEMENT

(75) Inventors: Wen-Chieh Wang, Taipei (TW); Kao-Wen Chang, Taipei (TW); Ming-Hsun Yang, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/800,619

(22) Filed: Mar. 16, 2004

(65) Prior Publication Data

US 2005/0135050 A1 Jun. 23, 2005

(30) Foreign Application Priority Data

Dec. 17, 2003 (TW) .............................. 92222117 U

(51) Int. Cl.
*H05K 5/00* (2006.01)
(52) U.S. Cl. .................. 361/683; 292/256.75; 248/918
(58) Field of Classification Search ........ 361/680–683, 361/686, 724–730; 248/917, 918; 292/256.75; 345/168, 173; 312/223.1, 223.2
See application file for complete search history.

(56) References Cited

U.S. PATENT DOCUMENTS

| 6,700,775 B1 * | 3/2004 | Chuang et al. ............. 361/680 |
| 6,788,527 B1 * | 9/2004 | Doczy et al. ............... 361/680 |
| 6,829,140 B1 * | 12/2004 | Shimano et al. ............ 361/683 |
| 2003/0002243 A1 * | 1/2003 | Newman et al. ............ 361/683 |
| 2004/0212954 A1 * | 10/2004 | Ulla et al. .................. 361/680 |

* cited by examiner

*Primary Examiner*—Lynn Feild
*Assistant Examiner*—Anthony Q. Edwards
(74) *Attorney, Agent, or Firm*—Bacon & Thomas, PLLC

(57) ABSTRACT

A portable computer and base member arrangement having a base member and a portable computer is disclosed. The base member has two stop flanges protruded upwardly from the top face in two rear corners and adapted to engage two recessed locating holes of the portable computer after attachment of the portable computer to the base member, and a swinging retainer plate fastened pivotally with the front side and provided with two retaining rods adapted to engage into corresponding retaining holes in the front peripheral side of the portable computer to lock the portable computer to the base member after engagement between the recessed locating holes with protruded retaining portions of the stop flanges of the base member.

2 Claims, 3 Drawing Sheets

PORTABLE COMPUTER AND BASE MEMBER RECEIVING ARRANGEMENT

BACKGROUND OF THE INVENTION

1. Field of the Invention

The present invention relates to a portable computer and base member receiving structure and more particularly, to a tablet PC and base member receiving structure, which enables the tablet PC to be locked to the base member when received thereto.

2. Description of Related Art

A portable computer, for example, a tablet PC may be used with a base member having a keyboard, so that the user can selectively use the digital induction pen of the tablet PC or the keyboard of the base member for data entry, forming a dual-usage portable computer.

A portable computer of this design is highly portable and convenient for use anywhere. However, because the portable computer and the base member are separately devices, it is not convenient to carry and receive the portable computer and the matching base member.

Therefore, it is desirable to provide a portable computer and base member receiving arrangement that eliminates the aforesaid problem.

SUMMARY OF THE INVENTION

The present invention has been accomplished under the circumstances in view. It is the main object of the present invention to provide a portable computer and base member receiving arrangement, which enables the portable computer to be closely attached to the base member and locked in position for carrying and storage conveniently.

To achieve this and other objects of the present invention, the portable computer and base member receiving arrangement comprises a base member and a portable computer. The base member comprises a top face, a front side, a rear side, a left side, a right side, at least one stop flange respectively protruded upwardly from the top face adjacent to the rear side, the at least one stop flange each having a protruded retaining portion transversely protruding in direction toward the front side, and a swinging retainer plate fastened pivotally on the front side and upwardly turnable toward the top face, the swinging retainer plate having at least one retaining rod, which is respective suspended above the top face when turned the swinging retainer plate toward the top face. The portable computer comprises a display face, a front peripheral side, a rear peripheral side, at least one recessed locating hole disposed in the rear peripheral side corresponding to the protruded retaining portion of the at least one stop flange of the base member, and at least one retaining hole formed in the front peripheral side corresponding to the at least one retaining rod of the swinging retainer plate. When attached the portable computer to the top face of the base member, the at least one recessed locating hole of the portable computer is respectively inserted into engagement with the protruded retaining portion of each stop flange, and the swinging retainer plate is turned upwards to the top face of the base member to force the at least one retaining rod insert into the at least one retaining hole of the portable computer to lock the portable computer to the base member. So the portable computer can closely attached to the base member and locked in position for carrying and storage conveniently.

DETAILED DESCRIPTION OF THE PREFERRED EMBODIMENT

Figure 1:
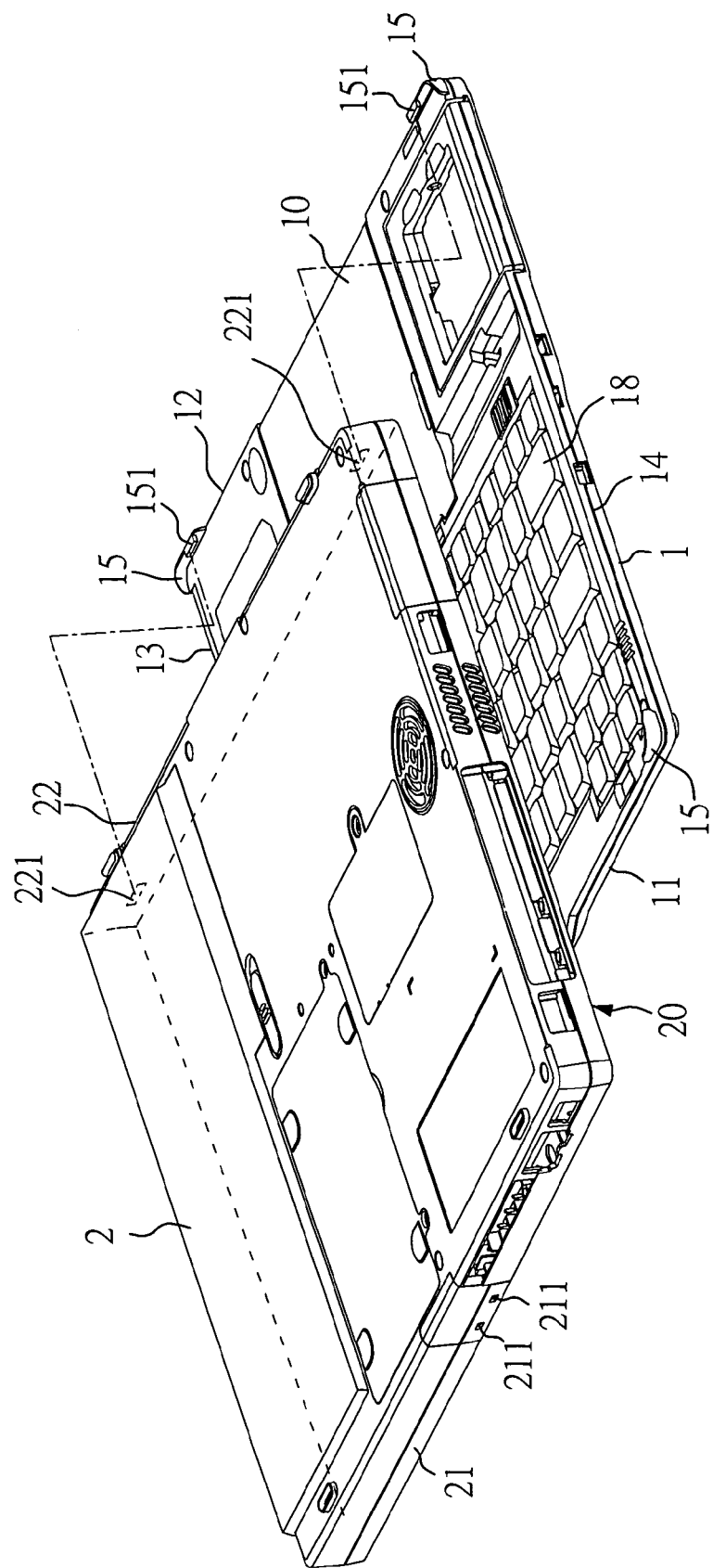
FIG. 1 is an exploded view of the preferred embodiment of the present invention.
Figure 2:
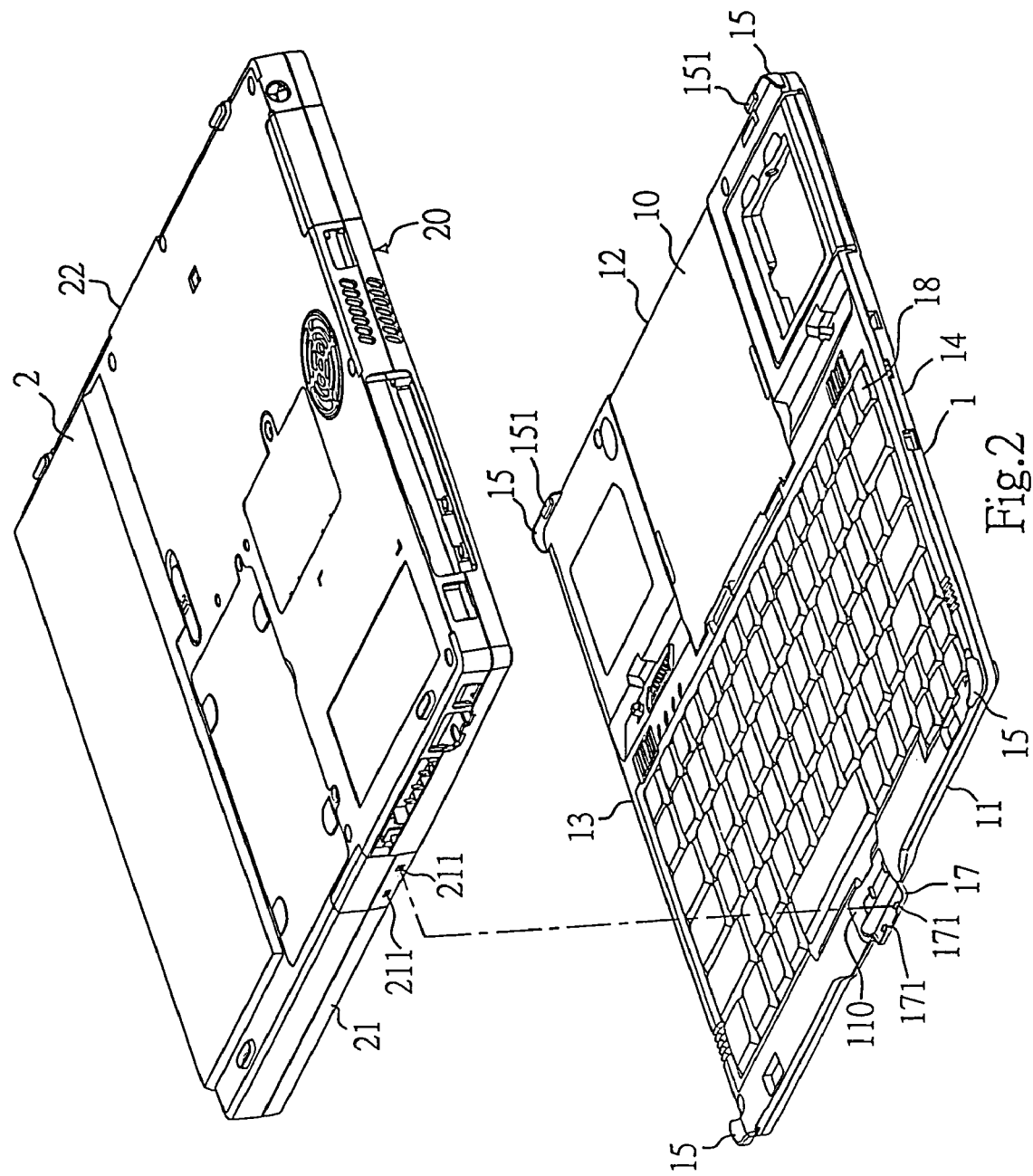
FIG. 2 is another exploded view of the preferred embodiment of the present invention.

Referring to FIGS. 1 and 2, a portable computer and base member receiving arrangement in accordance with the present invention is shown comprised of a base member 1 and a portable computer 2. The base member 1 has a top face 10, a front side 11, a rear side 12, a left side 13, a right side 14, a keyboard 18 provided at the top face 10, two stop flanges 15 respectively protruded upwardly from the top face 10 at two distal ends of the rear side 12, a front recess 110 formed in the front side 11 on the middle position, a swinging retainer plate 17 pivoted to the front recess 110 and upwardly turnable to the top face 10. The stop flanges 15 are L-shaped flanges respectively extended from the rear side 12 toward the left side 13 and right side 14, each having a protruded retaining portion 151 transversely protruding in direction toward the front side 11. The swinging retainer plate 17 comprises two retaining rods 171, which are suspended above the top face 10 when the swinging plate 17 turned toward the top face 10.

The portable computer 2 according to the present preferred embodiment is a tablet PC having a display face 20, a front peripheral side 21, a rear peripheral side 22, two recessed locating holes 221 respectively disposed in the rear peripheral side 22 near the two distal ends corresponding to the protruded retaining portions 151 of the stop flanges 15, two retaining holes 211 formed in the front peripheral side 21 corresponding to the retaining rods 171 of the swinging retainer plate 17 at the front side 11 of the base member 1.

Figure 3:
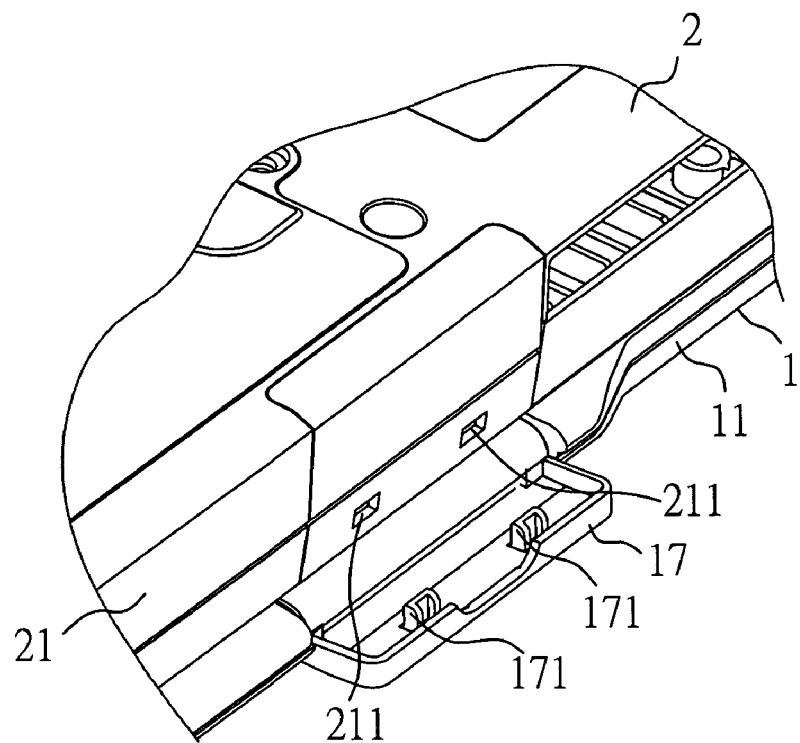
FIG. 3 is an enlarged view of a part of the present invention showing the portable computer attached to the base member before locking of the swinging retainer plate.
Figure 4:
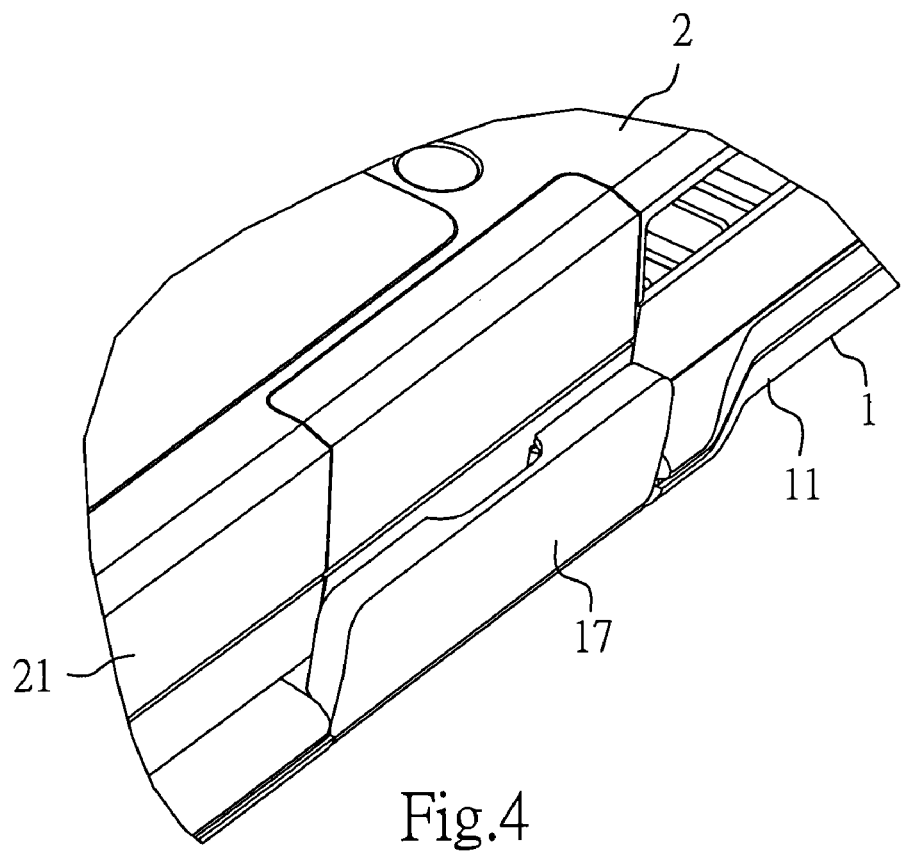
FIG. 4 is similar to FIG. 3 but showing the swinging retainer plate locked to the portable computer.

Referring to FIGS. 3 and 4 and FIGS. 1 and 2 again, when receiving the equipment, hold the portable computer 2 in a slightly inclined position relative to the base member 1 with the display face 20 of the portable computer 2 facing the top face 10 of the base member 1, and then closely attach the portable computer 2 to the top face 10 of the base member 1 to force the recessed locating holes 221 of the portable computer 2 inserted into engagement with the protruded retaining portions 151 of the stop flanges 15, and then turn the swinging retainer plate 17 upwards to the top face 10 of the base member 1 to force the retaining rods 171 of the swinging retainer plate 17 inserted into the retaining holes 211 of the portable computer 2, and therefore the portable computer 2 is closely secured to the top face 10 of the base member 1 and locked thereto for carrying and storage conveniently.

Referring to FIGS. 1 and 2 again, the base member 1 can be made having two additional L-shaped stop flanges 15 respectively protruded upwardly from the top face 10 at two distal ends of the front side 11 and respectively extended along the left side 13 and the right side 14, i.e., a L-shaped stop flange 15 is respectively disposed in each of the four corners of the base member 1 for stopping the portable computer 1 in position after placement of the portable computer 2 on the top face 10 of the base member 1.

Further, the recessed locating holes 221 in the rear peripheral side 22 of the portable computer 2 and the retaining holes 211 in the front peripheral side 21 of the portable computer 2 can be respectively formed on the middle position of the wall thickness (height) of the portable computer 2 so that the portable computer 2 can be closely be attached to the base member 1 with the display face 20 received to the top face 10 of the base member 1, or alternatively with the display face 20 disposed opposite to the top face 10 of the base member 1.

Although the present invention has been explained in relation to its preferred embodiment, it is to be understood that many other possible modifications and variations can be made without departing from the spirit and scope of the invention as hereinafter claimed.

What is claimed is:

1. A portable computer receiving arrangement comprising:
    a base member, said base member comprising a top face, a front side, a left side, a right side, at least one stop flange protruding upwardly from said top face adjacent to said rear side, said at least one stop flange having a protruding retaining portion transversely protruding toward said front side, and a switching retainer plate fastened pivotally on said front side and upwardly turnable toward said top face, wherein said swinging retainer plate includes at least one retaining rod, said at least one retaining rod being suspended above said top face when said swinging retainer plate is turned toward said top face; and
    a portable computer, said portable computer comprising a display face, a front peripheral side, a rear peripheral side, at least one recessed locating hole disposed in said rear peripheral side corresponding to the protruding retaining portion of the at least one stop flange of said base member, and at least one retaining hole formed in said front peripheral side corresponding to the at least one retaining rod of said swinging retainer plate;
    wherein when said portable computer is attached to the top face of said base member, said at least one recessed locating hole of said portable computer is respectively inserted into engagement with the protruding retaining portion of each said stop flange, and said swinging retainer plate is turned upwards to the top face of said base member to force said at least one retaining rod insert into the at least one retaining hole of said portable computer to lock said portable computer to said base member,
    wherein said base member further comprises a front recess formed on the top face and adjacent to said front side in the middle position, said front recess being adapted to accommodate said swinging retainer plate, and a keyboard disposed at said top face,
    wherein the number of said at least one stop flange is two, and the two stop flanges respectively protrude upwardly from said top face at two distal ends of said rear side; and the number of the at least one recessed locating hole of said portable computer is two, said two recessed locating holes being adapted to receive the protruded retaining portions of said two stop flanges, and
    wherein said two stop flanges are L-shaped stop flanges respectively protruding upwardly from said top face and respectively extending from said rear side toward said left side and said right side.

2. The portable computer receiving arrangement as claimed in claim 1, wherein said portable computer is a tablet PC.

* * * * *